United States Patent [19]

Fortino et al.

[11] Patent Number: 4,558,390

[45] Date of Patent: Dec. 10, 1985

[54] BALANCED DUAL-GAP PROTECTOR

[75] Inventors: Placido S. Fortino, Bethlehem; Laird K. S. Haas, Orefield; Siu-Ping Hong, Wescosville; Wing C. Lo; Edward J. Neupauer, both of Bethlehem, all of Pa.

[73] Assignee: AT&T Bell Laboratories, Murray Hill, N.J.

[21] Appl. No.: 561,886

[22] Filed: Dec. 15, 1983

[51] Int. Cl.[4] .......... H02H 9/06

[52] U.S. Cl. .......... 361/119; 361/129

[58] Field of Search .......... 361/120, 129, 119, 128, 361/130; 313/346 R, 306, 355

[56] References Cited

U.S. PATENT DOCUMENTS

| | | | |
|---|---|---|---|
| 3,866,091 | 2/1975 | Kawiecki | 361/120 X |
| 3,934,175 | 1/1976 | Clark . | |
| 3,958,154 | 5/1976 | Hill et al. | 361/120 X |
| 4,015,172 | 3/1977 | Peche et al. | 361/129 |
| 4,074,338 | 2/1978 | Simobat | 361/129 |
| 4,084,208 | 4/1978 | Bazarian et al. | 361/120 |
| 4,104,693 | 8/1978 | Toda et al. | 361/120 |
| 4,175,277 | 11/1979 | Zuk | 361/120 |
| 4,266,260 | 5/1981 | Lange et al. | 361/129 X |
| 4,433,354 | 2/1984 | Lange et al. | 361/120 |

FOREIGN PATENT DOCUMENTS

| | | | |
|---|---|---|---|
| 1950090 | 4/1971 | Fed. Rep. of Germany | 361/120 |
| 2085222 | 4/1982 | United Kingdom | 361/120 |

*Primary Examiner*—Harry E. Moose, Jr.
*Attorney, Agent, or Firm*—Lester H. Birnbaum

[57] ABSTRACT

Disclosed is a dual-gap protector wherein both gaps will break down essentially simultaneously when a pulse of either polarity having a sufficient magnitude appears. An annular electrode is provided in the housing so as to form parallel gaps with respective end electrodes. The electrodes include a surface coating of a photoemissive and/or thermionic material so that light emission or heat resulting from the breakdown of one gap will influence the breakdown of the other gap.

7 Claims, 1 Drawing Figure

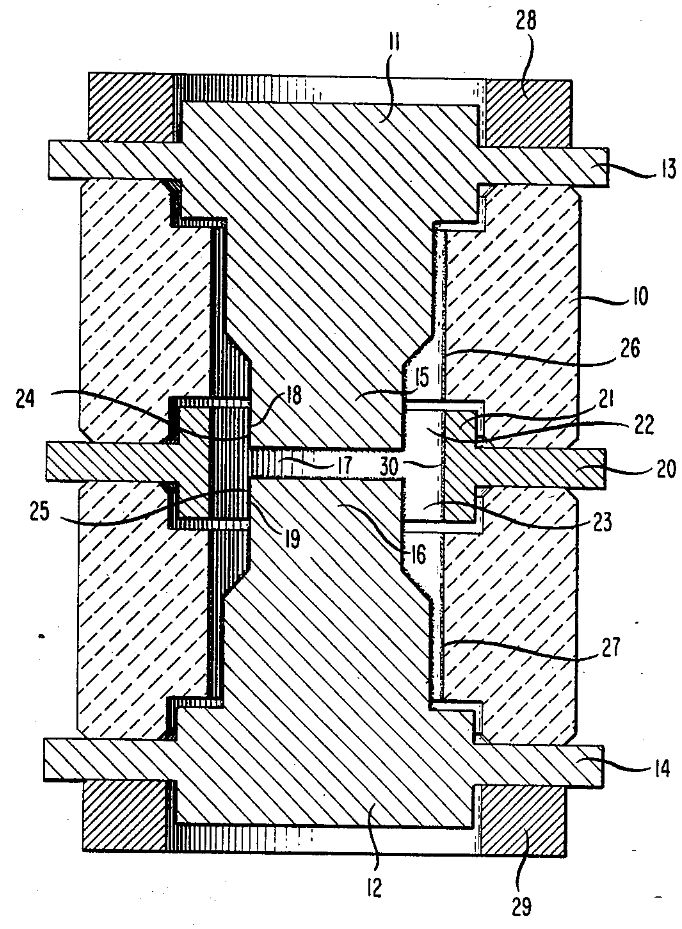
28
11
13
10
26
24
18
15
21
22
17
30
20
25
19
16
23
27
14
12
29

BALANCED DUAL-GAP PROTECTOR

BACKGROUND OF THE INVENTION

This invention relates to surge protectors, and in particular to balanced dual-gap protectors.

In a variety of apparatus, protection against surges due to lightning, induced AC power, power faults, and other causes is essential. A standard type of protector, used for example in telephone systems, is the sealed gas surge limiter. This device typically includes a pair of electrodes mounted at opposite ends of a cylindrical housing, which housing provides an hermetic enclosure including an ionizable gas such as argon. A narrow gap is formed between the electrodes so that normally there is no conduction through the device. However, when a surge of sufficient magnitude and duration appears at the electrodes, the gas in the gap is sufficiently ionized so that the gap breaks down and current is conducted through the device and away from the protected apparatus which is connected in parallel therewith. (For an example of a narrow gap surge limiter, see, for example, U.S. Pat. No. 4,175,277 issued to Zuk.)

In many electrical systems, a pair of lines is utilized to carry the current signal so that the lines are usually at an approximately equal voltage with respect to ground. In such systems, a dual-gap surge limiter is typically employed. This device includes a third electrode between the previously described end electrodes so that separate gaps are formed between the third electrode and the end electrodes. The end electrodes are coupled to the signal lines and the middle electrode is coupled to ground. (See, e.g., U.S. Pat. No. 3,934,175 issued to Clark.)

In the event of a surge, it is desirable to have both gaps break down essentially simultaneously so that the surge will be shunted from both lines to ground and balanced operation is achieved. However, because of voltage division effects on the lines, the voltage across the gap which has not broken down is reduced immediately upon the breakdown of the first gap. Thus, the breakdown of the second gap must be induced to occur at a voltage which is lower than the normal breakdown voltage for the device in order to achieve balanced operation. As far as applicants are aware, it has not been possible prior to this invention to have the second gap break down reliably and independently of polarity when the voltage across the second gap is substantially reduced (typically to less than 20% of the device breakdown voltage).

Thus, reliance was typically placed on providing elements external to the surge limiter for achieving this balance. (See, e.g., U.S. patent application of S. Hong, Ser. No. 493,997, filed May 12, 1983 and assigned to the present assignee.)

It is, therefore, a primary object of the invention to provide a protector with at least two gaps where the gaps will break down essentially simultaneously when a surge of either polarity appears on the device electrodes even when the voltage across the second gap is reduced to less than 20% of the device breakdown voltage.

SUMMARY OF THE INVENTION

This and other objects are achieved in accordance with the invention which is a surge protector comprising a pair of electrodes disposed in a housing and having side surfaces facing the housing. A third electrode extends around the periphery of the housing so as to define essentially parallel gaps with the side surfaces of the pair of electrodes. A portion of at least one electrode defining each gap has a surface coating which reduces the breakdown voltage of that gap after the breakdown of the other gap.

BRIEF DESCRIPTION OF THE DRAWING

These and other features of the invention will be delineated in the following description. In the drawing:

The FIGURE is a cross-sectional view of a device in accordance with one embodiment of the invention.

It will be understood that for purposes of illustration, this FIGURE is not necessarily made to scale.

DETAILED DESCRIPTION

The basic principles of the invention will now be described with reference to the embodiment illustrated in the FIGURE. The device includes a housing, 10, which in this example is cylindrical and made of $Al_2O_3$. Mounted at opposite ends of the housing by means of flanges, 13 and 14, are end electrodes, 11 and 12, in this example made of copper, which are also essentially cylindrical and have tapered sections, 15 and 16, in the area of the middle of the housing. (The formation of tapered sections aids in electrode assembly and is not needed in the present invention.) The electrodes form a gap, 17, between their front surfaces which in this example is approximately 20 mils. The side surfaces, 18 and 19, of the end electrodes face the inner surface of the housing and are essentially concentric therewith.

Mounted within the housing by means of flange 20 is a third, annular, center electrode, 21, with a surface which faces, and is essentially concentric with, the surfaces, 18 and 19, of the other electrodes. The center electrode thereby defines separate gaps, 22 and 23, with the side surfaces of electrodes, 11 and 12, respectively. These gaps, which are the dual gaps of the device, are essentially parallel and in this example measure approximately 23.5 mils.

Included on surfaces, 18 and 19, of the electrodes, 11 and 12, and on the surface of electrode, 21, are layers, 24, 25, and 30, of a material which will lower the breakdown voltage of the gap between one of the pair of end electrodes and the center electrode as a result of the breakdown of the parallel gap between the other end electrode of the pair and the center electrode. Preferably, these layers are photoemissive and/or thermionic so that heat and/or light from the breakdown of the other gap will cause emission of electrons from the layer, which will reduce the breakdown voltage of the second gap. The material should therefore have a relatively low work function and is preferably sprayable and strongly adherent to the electrode surfaces.

In one example, the material was a glass with a high quantity of sodium which was sprayed onto the electrodes in the form of a single coating. In particular, the presently preferred composition is a mixture consisting essentially of approximately 34 mole percent $Na_2O$, approximately 2 mole percent BaO, approximately 26 mole percent $B_2O_3$, approximately 22 mole percent $Al_2O_3$ and approximately 16 mole percent $SiO_2$. In general, a useful glass domain including the above five components can be defined according to the following approximate proportions:

2 mole percent BaO;

30–40 mole percent $Na_2O+BaO$;

43–66 mole percent $B_2O_3+Al_2O_3$; and

2–27 mole percent $SiO_2$.

The domain is further defined by the following approximate ratios:

$$\frac{B_2O_3}{Al_2O_3} = 1.0\text{–}2.0$$

$$\frac{Na_2O + BaO}{B_2O_3 + Al_2O_3} = 0.5\text{–}1.1$$

$$\frac{Na_2O + BaO}{SiO_2} = 1.1\text{–}26.0$$

$$\frac{SiO_2}{B_2O_3 + Al_2O_3} = 0.03\text{–}0.60$$

Of course, it will be appreciated that other glass domains utilizing the same or different components may also be used in the invention.

The glass compositions were melted at 1000°–1100° C. for approximately 4½ hours and fritted in deionized water. The frits were dried at 60° C. and ground to a fine powder. The powder was suspended in a mixture of methanol and deionized water in a particular example, utilizing 10 gms of glass, 450 ml of deionized water and 450 ml of methanol. The mixture was sprayed on the copper electrodes 11, 12 and 21, prior to their assembly in the surge limiter, to a thickness of approximately 3.5 μm.

In a further example, coatings of a different material were applied in two steps. The copper electrodes were first coated with sodium tetraborate ($Na_2B_4O_7$) to a thickness of about 10 μm. A cover coat was then applied comprising a mixture of 47.4 percent zirconium hydride ($ZrH_2$), 0.5 percent barium zirconate ($BaZrO_3$), 4.7 percent silver powder and 47.4 percent of a high lead glass such as that sold by Corning under the designation 7570. The first coating promotes adherence of the second coating with the copper electrodes while the second coating provides both thermionic and photoemissive properties. The total thickness of the two step coating was approximately 50 μm. Both coatings were mixed with deionized water and methanol so they could be sprayed on. In particular, the first coating had 10 parts by volume DI water, 10 parts by volume methanol and 1 part by volume of $Na_2B_4O_7$. The cover coat had 10 parts by volume $ZrH_2$, 10 parts by volume glass, 1 part silver powder, 150 parts DI water, 150 parts methanol and 0.1 parts $BaZrO_3$.

A series of carbon stripes, such as 26 and 27, were also provided longitudinally on the surfaces of the housing to provide a flashover mechanism for reducing surge limiting voltage. The device was hermetically sealed with the aid of NiFe end-rings, 28 and 29, and the gas within the housing, 10, in this example was pure argon with a pressure of 480 torr.

In operation, the device is electrically coupled in parallel with the protected apparatus, such as a repeater, with electrodes, 11 and 12, each coupled to a different one of the pair of signal lines of the system, such as a digital transmission system. The annular center electrode, 21, is coupled to ground. At any point in time, a surge of positive or negative voltage may appear on both lines. If the surge has a sufficient magnitude, one of the gaps will break down and current will be conducted from one of the lines to ground. At this point, the voltage on the other line will be reduced due to the voltage divider effect between the line and load impedances. Full protection of the apparatus therefore depends on the second gap breaking down essentially simultaneously with the breakdown of the first gap even though the voltage across the second gap is less than the normal dc breakdown voltage of the device. This balance is achieved in the device of the FIGURE due primarily to two factors. First, the gaps, 22 and 23, are situated so there is maximum exposure of one gap to the ionization occurring in the other gap when the latter breaks down. For this to occur, it is recommended that the gap widths be in the range 15–30 mils and end electrodes 15 and 16 be separated by a distance also in the range 15–30 mils. Second, as previously mentioned, when the first gap breaks down, the light and/or heat incident on the second gap will cause emission of electrons from the surface coating, 30 and 24 or 25, which lowers the breakdown voltage of the second gap sufficiently so that it breaks down even at the reduced voltage on the second line. The device is therefore balanced regardless of the polarity appearing on the lines.

It will be appreciated that gap, 17, normally does not play a part in the operation of the device since electrodes, 11 and 12, during normal operation are at essentially the same voltage, and even after the breakdown of one of the gaps, 22 and 23, the voltage difference between electrodes, 11 and 12, will be insufficient to cause breakdown of gap, 17. Gap, 17, should be made large enough, however, so as not to break down during normal operation even if there is some difference in voltage between the two lines (usually less than 220 volts).

One additional important consideration in choosing an appropriate surface coating is the tendency of the material to continue to emit electrons after the surge has disappeared, which may cause the device to fail to turn off under certain conditions if a dc bias is present on the lines. In this example, the coatings previously mentioned using the single step or two-step coating process satisfied both the desired balance conditions during turn-on and good turn-off characteristics, but other materials might also be used.

Devices fabricated in accordance with the specific examples described above (both single coated and dual coated) were tested in a circuit which simulated a digital transmission system with line impedances of 100 ohms and a repeater input impedance of approximately 12 ohms. A 700 volt peak, 500 volt RMS, AC voltage was applied to simulate one of the causes of surges on telephone lines, i.e., an induced AC signal from nearby power lines. The protectors typically had breakdown voltages of approximately 320 volts, arc voltages of approximately 25 volts and turn-off voltages of approximately 180 volts. The effectiveness of the devices was determined by the amount of "unbalance", U, which is:

$$U = \int_0^{1sec} |V_2(t) - V_1(t)|\,dt$$

where $V_2(t)$ and $V_1(t)$ are the voltages on electrodes, 11 and 12. The voltage difference in this equation is the voltage across the protected apparatus. In a typical surge limiter fabricated in accordance with the invention, the amount of unbalance under the specific alternating voltage surge applied as mentioned was less than 7 volt-sec initially as compared with approximately 48 V-sec for a completely unbalanced case. Stating it another way, the invention results in devices where the second gap will break down typically less than 1.25 millisecs after the first gap under the test condition mentioned. In general, the amount of unbalance should be less than 12 volt-sec and the second gap should break down within 1.9 millisec of the first gap to provide adequate protection.

The above tests utilized the AC power fault condition since energy dissipation in the protected apparatus is highest in that case if the protector is not properly balanced. The device is also advantageous when the surge is due to other causes, such as lightning strikes.

It should be understood that the terms "breakdown" and "breakdown voltage" are intended to be general enough to indicate conduction across the gap due to a pulse of any rise-time. It will be appreciated further that the term "electron-emissive" used in the claims is intended to describe materials which are thermionic or photoemissive or both. It will also be appreciated that the device could include more than the three electrodes and two gaps shown in the FIGURE.

Various additional modifications will become apparent to those skilled in the art. All such variations which basically rely on the teachings through which the invention has advanced the art are properly considered within the spirit and scope of the invention.

What is claimed is:

1. A surge protector comprising:

a pair of electrodes disposed in a housing and having side surfaces facing the housing; and a third electrode extending around the periphery of said housing so as to define essentially parallel gaps with the side surfaces of the said pair of electrodes, a portion of at least one electrode defining each gap having a surface coating which reduces the breakdown voltage of that gap after the breakdown of the other gap, wherein said coating is a mixture comprising zirconium hydride, barium zirconate, silver powder and glass, or a mixture comprising $Na_2O$, BaO, $B_2O_3$, $Al_2O_3$ and $SiO_2$.

2. The device according to claim 1 wherein the mixture comprises approximately 2 mole percent BaO, 30–40 mole percent ($Na_2O$+BaO), approximately 43–66 mole percent ($B_2O_3+Al_2O_3$) and approximately 2–27 mole percent $SiO_2$, with a ratio of $B_2O_3$ to $Al_2O_3$ of approximately 1–2, a ratio of $$\frac{Na_2O + BaO}{B_2O_3 + Al_2O_3}$$

of 0.5–1.1, a ratio of $$\frac{Na_2O + BaO}{SiO_2}$$

of 1.1–26.0, and a ratio of $$\frac{SiO_2}{B_2O_3 + Al_2O_3}$$

of 0.03–0.60.

3. The device according to claim 1 wherein the two gaps are adapted to break down within 1.9 millisecs of each other when an AC voltage with a peak of approximately 700 volts is applied to the electrodes.

4. The device according to claim 1 wherein the surface coating is formed on at least the side surfaces of the pair of electrodes and the surface of the annular electrode.

5. The device according to claim 1 wherein the protector is a sealed gas surge limiter.

6. The device according to claim 1 wherein the gaps are within the range 15–30 mils and are separated from each other by a distance in the range 15–30 mils.

7. A sealed gas surge limiter comprising:

a pair of electrodes disposed in a sealed cylindrical housing and having side surfaces facing and essentially concentric with the housing:

a third electrode extending around the periphery of said housing so as to define essentially parallel gaps with the side surfaces of the said pair of electrodes, the gaps being in the range 15–30 mils and separated by a distance in the range 15–30 mils; and a layer of material which is electron emissive formed on the surfaces of the three electrodes defining the gaps to reduce the breakdown voltage of one gap after the breakdown of the other gap, the material comprising $Na_2O$, BaO, $B_2O_3$, $Al_2O_3$ and $SiO_2$, such that the gaps are adapted to break down within 1.9 milliseconds of each other when an AC voltage with a peak of approximately 700 volts is applied to the pair of electrodes.

* * * * *